(12) United States Patent
Pedder et al.

(10) Patent No.: US 11,092,094 B2
(45) Date of Patent: Aug. 17, 2021

(54) METHODS AND SYSTEMS FOR ENGINE CONTROL

(71) Applicant: Transportation IP Holdings, LLC, Norwalk, CT (US)

(72) Inventors: Jacob Pedder, State College, PA (US); Daniel Yerace, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 118 days.

(21) Appl. No.: 16/409,690

(22) Filed: May 10, 2019

(65) Prior Publication Data

US 2019/0345886 A1 Nov. 14, 2019

Related U.S. Application Data

(60) Provisional application No. 62/670,567, filed on May 11, 2018.

(51) Int. Cl.
*F02D 41/00* (2006.01)
*F02D 19/06* (2006.01)
*F02D 19/08* (2006.01)

(52) U.S. Cl.
CPC ..... *F02D 41/0025* (2013.01); *F02D 19/0642* (2013.01); *F02D 19/081* (2013.01); *F02D 41/0082* (2013.01)

(58) Field of Classification Search
CPC ............. F02D 41/0025; F02D 19/0642; F02D 19/081; F02D 41/0082; F02D 19/0647;
(Continued)

(56) References Cited

U.S. PATENT DOCUMENTS 6,947,830 B1 * 9/2005 Froloff ............... F02D 41/3076
701/111
9,822,727 B2 11/2017 Ottikkutti et al.
(Continued)

FOREIGN PATENT DOCUMENTS

AU 2016204033 A1 1/2017
EP 3015687 A1 5/2016
(Continued)

OTHER PUBLICATIONS

European Patent Office, Extended European Search Report Issued in Application No. 19173899.6, dated Oct. 21, 2019, Germany, 9 pages.

*Primary Examiner* — Hung Q Nguyen
(74) *Attorney, Agent, or Firm* — McCoy Russell LLP

(57) ABSTRACT

Various methods and systems are provided for adjusting fueling to groups of cylinders of an engine based on individual cylinder knock sensor outputs. As one example, a system for an engine includes: a controller with computer readable instructions stored on non-transitory memory that when executed during operation of the engine cause the controller to: deliver natural gas and diesel fuel to a first group of cylinders at amounts that produce a common, first substitution ratio of natural gas; deliver natural gas and diesel fuel to a second group of cylinders at amounts that produce a common, second substitution ratio of natural gas; and change a makeup of each of the first group of cylinders and the second group of cylinders based on individual knock sensor outputs of each cylinder of the first group of cylinders and the second group of cylinders.

20 Claims, 6 Drawing Sheets

(58) Field of Classification Search
CPC ........... F02D 2200/0611; F02D 19/105; F02D 41/0027; F02D 41/0085; F02D 35/027; F02D 2250/26; Y02T 10/30
See application file for complete search history.

(56) References Cited

U.S. PATENT DOCUMENTS

| | | | |
|---|---|---|---|
| 9,863,342 B2 | 1/2018 | Tulapurkar et al. | |
| 2004/0182359 A1* | 9/2004 | Stewart | F02B 11/00 123/295 |
| 2009/0308367 A1* | 12/2009 | Glugla | F02D 41/008 123/575 |
| 2014/0366840 A1* | 12/2014 | Sivasubramanian | F02D 41/0025 123/399 |
| 2015/0059686 A1* | 3/2015 | Glugla | F02D 41/30 123/299 |
| 2015/0159573 A1* | 6/2015 | Glugla | F02D 37/02 701/103 |
| 2016/0010581 A1* | 1/2016 | Sixel | F02P 9/002 60/601 |
| 2017/0122246 A1 | 5/2017 | Ottikkutti et al. | |
| 2017/0234245 A1* | 8/2017 | Bruner | F02D 35/027 123/525 |
| 2017/0370316 A1* | 12/2017 | Bauer | F02D 41/0085 |

FOREIGN PATENT DOCUMENTS

| | | |
|---|---|---|
| JP | 2000008897 A | 1/2000 |
| KR | 20160041523 A | 4/2016 |

\* cited by examiner

US 11,092,094 B2

METHODS AND SYSTEMS FOR ENGINE CONTROL

CROSS REFERENCE TO RELATED APPLICATIONS

The present application claims priority to U.S. Provisional Application No. 62/670,567, entitled "METHODS AND SYSTEMS FOR MITIGATING KNOCK TO ENGINE CYLINDERS BASED ON INDIVIDUAL CYLINDER KNOCK SENSOR OUTPUTS", and filed on May 11, 2018. The entire contents of the above-listed application are hereby incorporated by reference for all purposes.

BACKGROUND

Technical Field

Embodiments of the subject matter disclosed herein relate to engine control. Other embodiments relate to mitigating knocking combustion of a multi-fuel engine.

Discussion of Art

A multi-fuel engine may combust more than one fuel in engine cylinders of the engine. As one example, a multi-fuel engine may combust both natural gas and diesel fuel. Adjusting fueling to the engine cylinders of the multi-fuel engine may include adjusting a substitution ratio of the two fuels delivered to the engine cylinders. As one example, the substitution ratio may be defined as a ratio of secondary fuel (e.g., natural gas) to total fuel (secondary fuel and primary fuel (e.g., diesel fuel)) delivered to the engine for combustion. As another example, the substitution ratio may be defined according to a gross indicated torque basis, with the substitution ratio being a ratio of gas fuel energy (e.g., gas torque) to total fuel energy (e.g., total torque from gaseous fuel and diesel fuel). Under different fueling and engine operating conditions, one or more engine cylinders may experience knock. Knock sensors coupled to the engine may indicate when knocking occurs. Adjusting the substitution ratio to engine cylinders may reduce knocking. In single-fuel engines, such as gasoline or 100% natural gas engines, knocking may be reduced and controlled by adjusting ignition timing.

BRIEF DESCRIPTION

In one embodiment, a system (e.g., a system for an engine) includes a controller with computer readable instructions stored on non-transitory memory that when executed during operation of the engine cause the controller to: deliver natural gas and diesel fuel to a first group of cylinders at amounts that produce a common, first substitution ratio of natural gas; deliver natural gas and diesel fuel to a second group of cylinders at amounts that produce a common, second substitution ratio of natural gas, the second substitution ratio lower than the first substitution ratio; and change a makeup of each of the first group of cylinders and the second group of cylinders based on individual knock sensor outputs of each cylinder of the first group of cylinders and the second group of cylinders.

DETAILED DESCRIPTION

Figure 1:
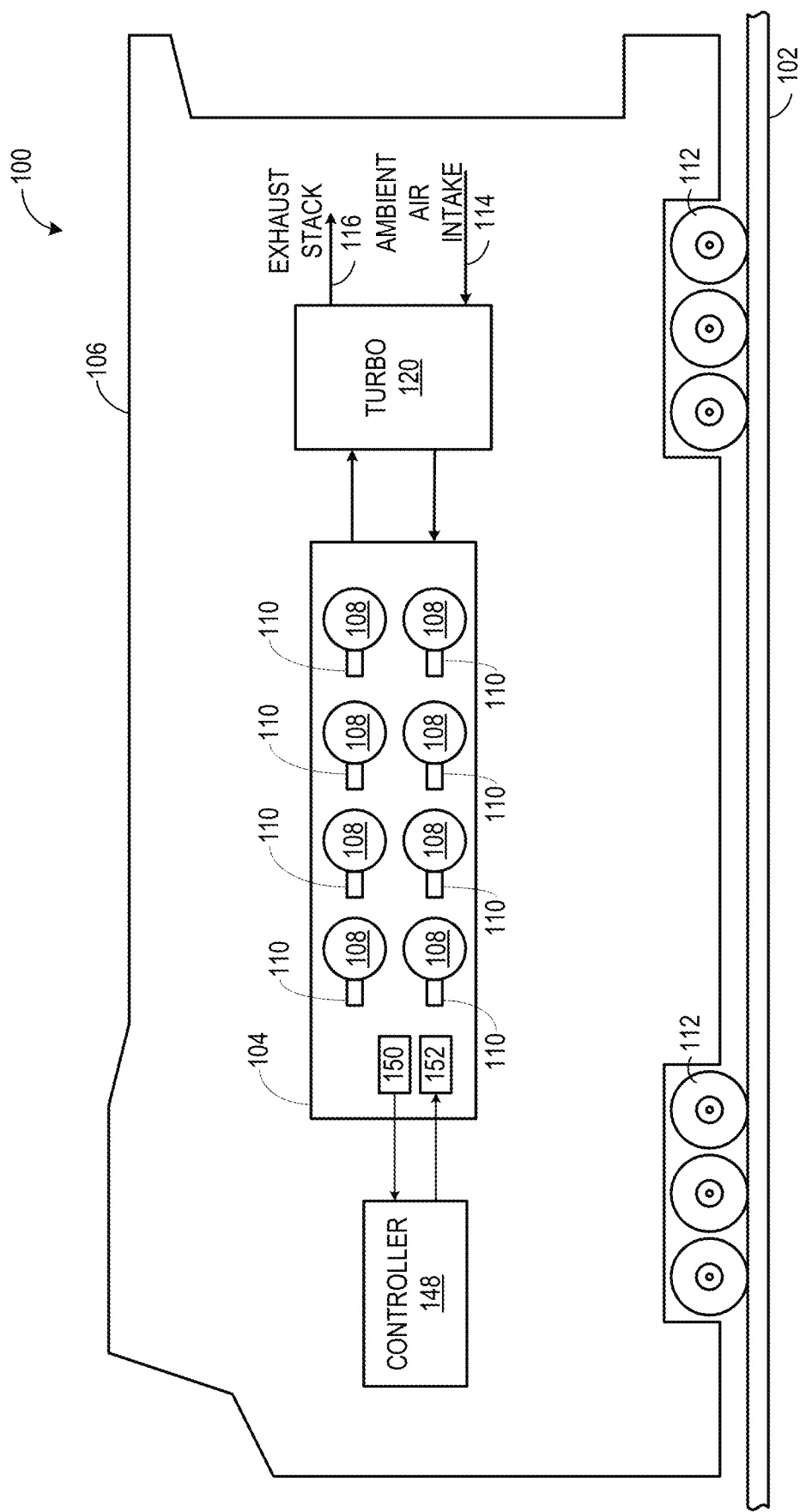
FIG. 1 shows a schematic diagram of a vehicle with an engine according to an embodiment of the disclosure.

The following description relates to embodiments of adjusting a-substitution ratio of a first fuel (e.g., gaseous fuel) torque to engine cylinders to reduce knock. In one example, a system for an engine includes a controller with computer readable instructions stored on non-transitory memory that when executed during operation of the engine cause the controller to: deliver natural gas and diesel fuel to a first group of cylinders at amounts that produce a common, first substitution ratio of natural gas; deliver natural gas and diesel fuel to a second group of cylinders at amounts that produce a common, second substitution ratio of natural gas, the second substitution ratio lower than the first substitution ratio; and change a makeup of each of the first group of cylinders and the second group of cylinders based on individual knock sensor outputs of each cylinder of the first group of cylinders and the second group of cylinders. As used herein, "common substitution ratio" refers to applying the same substitution ratio to each cylinder within the same group. For example, each cylinder within the first group of cylinders receives natural gas and diesel fuel at amounts that produce the same (e.g. common), second substitution ratio. In this way, for only two groups of cylinders, only two substitution ratios are being commanded at any one time (the same first substitution ratio for the first group and the same second substitution ratio for the second group. In one example, the engine is a multi-fuel engine combusting at least two fuels including natural gas and diesel fuel. However, in alternate embodiment, alternate or different fuels may be combusted by the multi-fuel engine. Further, in alternate examples, the cylinders of the engine may be broken up into more than two groups, such as three groups, where each group receives natural gas and diesel fuel at a different substitution ratio. For example, the number of groups of cylinders receiving different substitution ratios may be any number between one and the number of cylinders of the engine. Further, at some times during operation of the engine, all cylinders of the engine may be in the first group of cylinders. For example, at start-up of the engine, all engine cylinders may be in the first group of cylinders and then, in response to one or more cylinders experiencing knock, the one or more cylinders may be moved to the second group of cylinders from the first group of cylinders. In some examples, the substitution ratio of natural gas is defined as the ratio of natural gas to total fuel (natural gas plus diesel fuel) delivered to the cylinders of the engine for combustion. As used herein, the substitution ratio or the substitution ratio of natural gas torque may be defined as the ratio of the gaseous fuel contribution to gross indicated torque (e.g., gas torque) to total gross indicated torque (e.g., gaseous fuel plus diesel fuel contributions to gross indicated torque). In one example, reducing the substitution ratio of natural gas may reduce knock in a cylinder.

Since natural gas is a less expensive fuel than diesel fuel, it may be desirable to use larger quantities of natural gas and lower quantities of diesel fuel for combustion at the engine cylinders of the engine. For example, a relatively high substitution ratio of natural gas to total fuel may be desired so that increased quantities of natural gas are combusted at the engine cylinders relative to diesel fuel. However, under certain engine operating conditions, such as relatively high load, using too much natural gas (e.g., relatively high substitution ratios, such as 90% natural gas to total fuel) may result in engine knock. For example, one or more engine cylinders may experience knock during engine operation. One method of reducing engine knock may include reducing the natural gas substitution ratio which reduces the amount of natural gas while increasing the amount of diesel fuel delivered to engine cylinders to maintain a desired engine output (e.g., driver demanded torque).

One cylinder or a subset of cylinders of the engine may be more knock prone than the other cylinders. One approach for addressing knock in one or more engine cylinders includes adjusting engine operating parameters (such as fueling, including the substitution ratio of two or more fuels delivered to the cylinders) for the entire engine. For example, this may include adjusting the substitution ratio of natural gas torque, via adjusting natural gas and diesel fueling amounts delivered to each cylinder to a same level for every cylinder of the engine, even if only one cylinder is knocking. However, the inventors herein have recognized that this approach would result in penalizing the substitution ratio of all cylinders of the engine due to one cylinder experiencing knock. This may increase engine costs by using increased amounts of diesel fuel. The inventors herein have further recognized that individually controlling fueling, including controlling the substitution ratio for each individual cylinder, based on individual cylinder knock outputs, would result in more complicated and costly engine control. For example, utilizing individual substitution ratios for each cylinder in a twelve-cylinder engine may result in twelve different substitution ratios being commanded at any one time. This results in complicated and inefficient engine control that increases engine costs.

The approach disclosed herein at least partially addresses these issues with completely universal and individual cylinder knock control. As one example, a method may include delivering natural gas and diesel fuel at a common, first substitution ratio of natural gas torque to each cylinder of a first group of cylinders; delivering natural gas and diesel fuel at a common, second substitution ratio of natural gas torque to each cylinder of a second group of cylinders, the second substitution ratio lower than the first substitution ratio. In one example, the first group of cylinders may include lightly knocking and/or non-knocking cylinders where the second group of cylinders may include more heavily knocking cylinders (e.g., higher levels of knock). Thus, the lower, second substitution ratio may be set at a level which may mitigate the knocking in the second group of cylinders. Further, a number of cylinders in the first group of cylinders and the second group of cylinders make up a total number of cylinders of the engine. The method may further include adjusting a makeup of the first group of cylinders and the second group of cylinders based on individual cylinder knock sensor outputs. In this way, the engine controller may have two groups or "bins": a first for non-knocking or reduced-knocking cylinders (e.g., cylinders that are slightly knocking, or knocking at a lower level than compared to the second group) and a second for cylinders that have been identified as more severely knocking (e.g., knock limited or experiencing are higher level of knock than cylinders in the first group). If knock above a threshold is detected in a cylinder, it would be placed in the more heavily knocking bin (e.g., second group) and have a lower substitution ratio of natural gas torque to total fuel energy applied to it compared to the other cylinders to mitigate the knock while the other, non or more lightly-knocking cylinders in the reduced-knocking bin (e.g., first group) are controlled at a higher substitution ratio. As knock in other cylinders is detected or the knock levels in individual cylinders change (e.g., increase/decrease), both the substitution ratios of each group and the makeup of the groups (e.g., which cylinders are assigned to which group) may be adjusted. In this way, a finite number of substitution ratios are being commanded at any one time (e.g., two—one for each cylinder group), thereby simplifying engine control. Further, by adjusting the makeup of the groups (e.g., moving cylinders between the two groups) and/or the substitution ratios of the groups based on individual cylinder knock sensor outputs, cylinder knock may still be mitigated while using as much natural gas in the engine as possible to further reduce engine costs.

Figure 2:
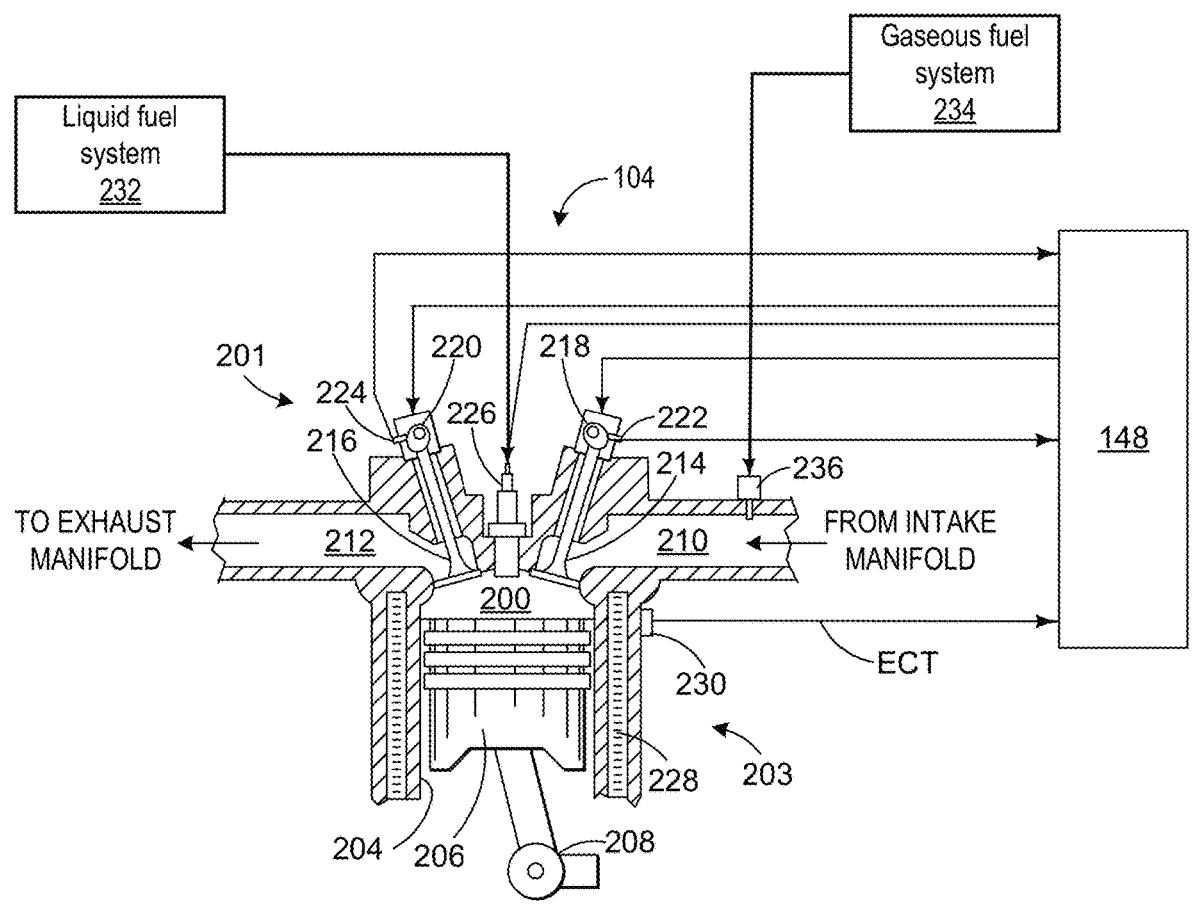
FIG. 2 shows a schematic diagram of an example cylinder of a multi-fuel engine according to an embodiment of the invention.
Figure 3:
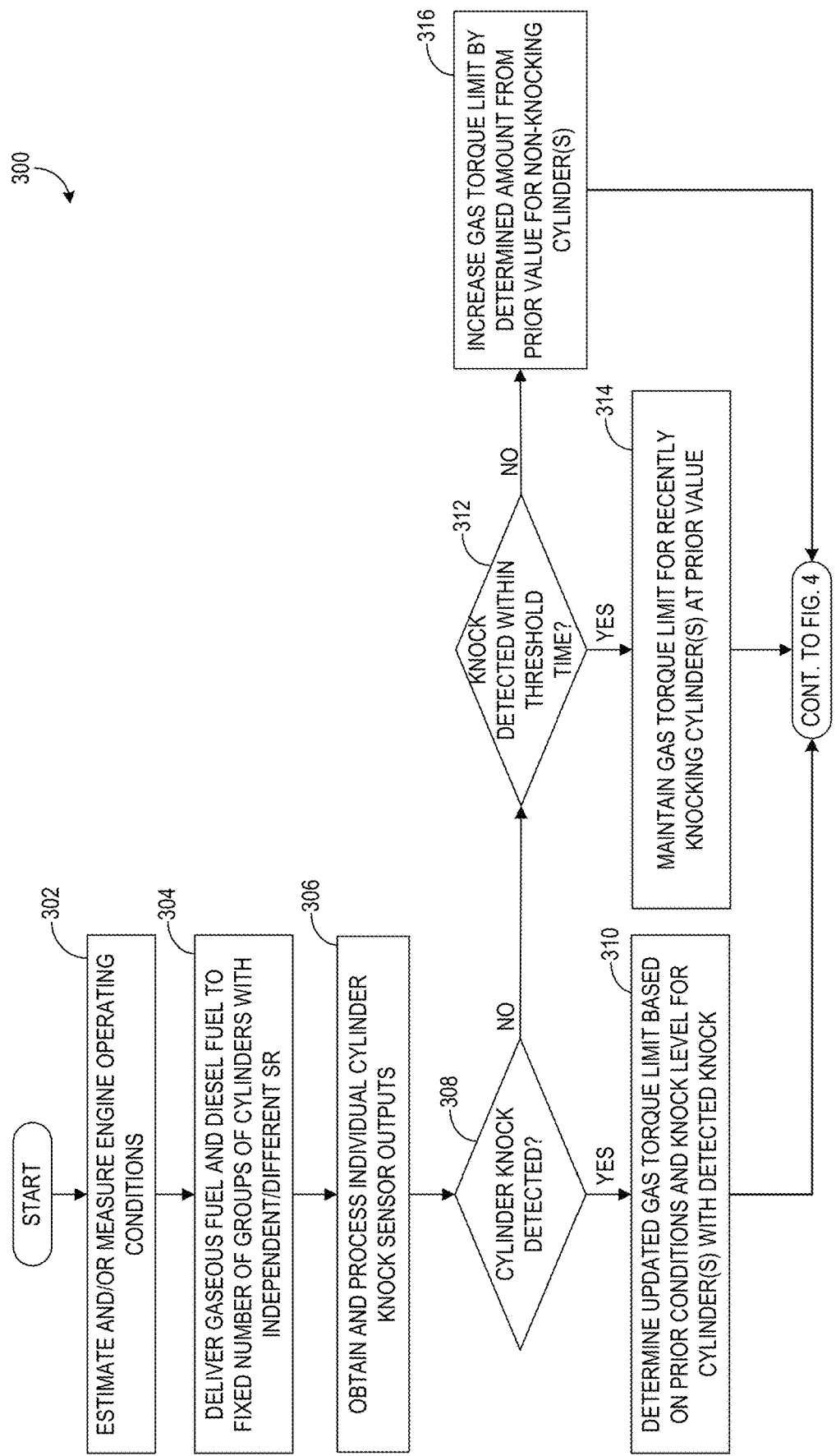
FIGS. 3-4 show a method for mitigating knock to groups of engine cylinders and adjusting a makeup of the groups based on individual cylinder knock sensor outputs, according to an embodiment of the invention.
Figure 4:
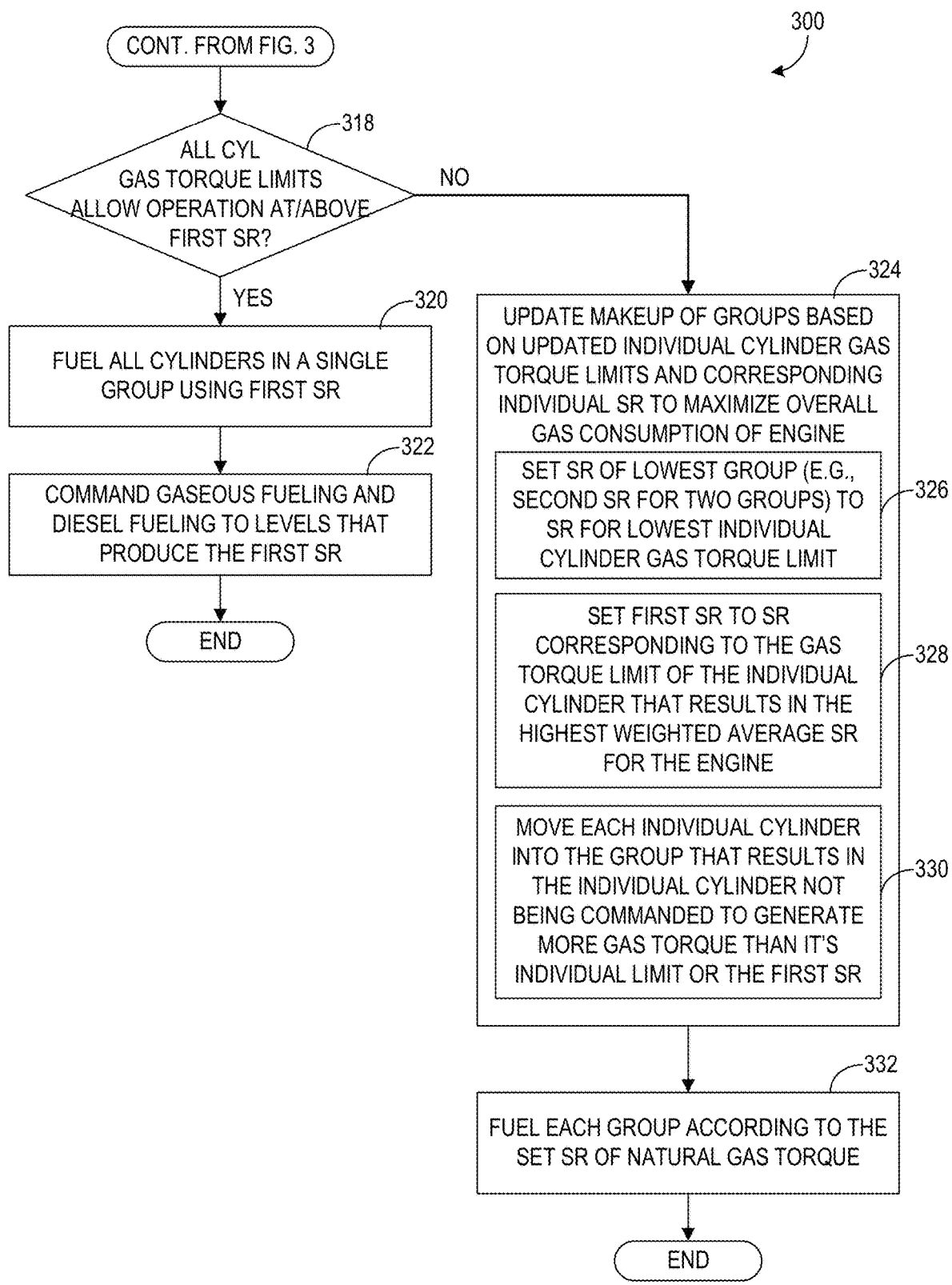
Figure 5:
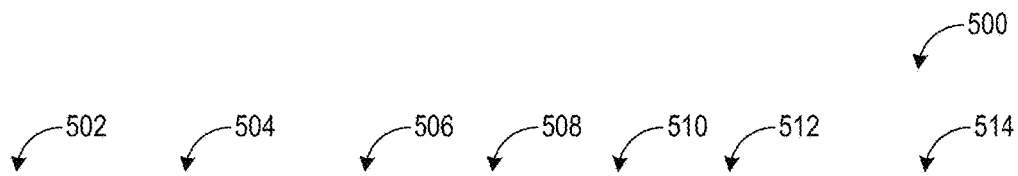
FIGS. 5-7 show tables illustrating different examples of cylinder gas torque limits, set group substitution ratios, and adjusted makeup of the groups based on the cylinder gas torque limits and corresponding individual cylinder substitution ratios, according to an embodiment of the invention.
Figure 6:
Figure 7:

FIG. 1 shows an example of a vehicle in which an engine is installed, such as a rail vehicle. The engine may include a plurality of engine cylinders and a knock sensor for each cylinder (e.g., power assembly). An example of a single cylinder of the engine, which may combust two fuels, such as natural gas and diesel fuel, is shown in FIG. 2. An engine controller may receive an output from the plurality of knock sensors. As shown in FIGS. 3-4, the controller may adjust fueling to engine cylinders based on a desired torque output of the engine and one of two set substitution ratios. Specifically, the controller may adjust an amount of natural gas and diesel fuel delivered to each cylinder so that each cylinder of a first group of cylinders receives the fuels at a higher, first substitution ratio and each cylinder of a second group of cylinders receives the fuels at a lower, second substitution ratio. The methods shown in FIGS. 3-4 further include adjusting the makeup of the two groups (e.g., which cylinders are placed in which groups and thus receive which of the first and second substitution ratios) based on individual cylinder knock sensor outputs. Example adjustments to the first and second substitution ratios and the makeup of the two groups based on individual knock sensor outputs are shown in FIGS. 5-7.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for adjusting operation of individual cylinders of an engine based on a knock sensor output, an example of a platform is disclosed in which the engine may be installed in a vehicle, such as a rail vehicle. FIG. 1 shows a block diagram of an embodiment of a vehicle system 100 (e.g., a locomotive system), herein depicted as vehicle 106. The illustrated vehicle is a rail vehicle configured to run on a rail 102 via a plurality of wheels 112. As depicted, the vehicle includes an engine system with an engine 104. In one embodiment herein, the engine is a multi-fuel engine operating with diesel fuel and natural gas, but in other examples the engine may use various combinations of fuels other than diesel and natural gas. In yet another embodiment, the engine may be a single-fuel engine operating with only one fuel, such as gasoline or natural gas.

The engine receives intake air for combustion from an intake passage 114. The intake passage receives ambient air from an air filter (not shown) that filters air from outside of the vehicle. Exhaust gas resulting from combustion in the engine is supplied to an exhaust passage 116. Exhaust gas flows through the exhaust passage, and out of an exhaust stack of the vehicle.

The engine system can includes a turbocharger 120 ("TURBO") (or supercharger) that is arranged between the intake passage and the exhaust passage. The turbocharger increases air charge of ambient air drawn into the intake passage in order to provide greater charge density during combustion to increase power output and/or engine-operating efficiency. The turbocharger may include a compressor (not shown in FIG. 1) which is at least partially driven by a turbine (not shown in FIG. 1). While in this case a single turbocharger is shown, other systems may include multiple turbine and/or compressor stages. In other embodiments, the engine system may not include a turbocharger.

In some embodiments, the engine system may include an exhaust gas treatment system coupled in the exhaust passage upstream or downstream of the turbocharger. In one example embodiment having a diesel engine, the exhaust gas treatment system may include a diesel oxidation catalyst (DOC) and a diesel particulate filter (DPF). In other embodiments, the exhaust gas treatment system may additionally or alternatively include one or more emission control devices. Such emission control devices may include a selective catalytic reduction (SCR) catalyst, three-way catalyst, NOx trap, as well as filters or other systems and devices.

A controller (e.g., electronic controller) 148 may be employed to control various components related to the vehicle system. In one example, the controller includes a computer control system. The controller further includes computer readable storage media (not shown) including code for enabling on-board monitoring and control of rail vehicle operation. The controller, while overseeing control and management of the vehicle system, may receive signals from a variety of sensors 150, as further elaborated herein, to determine operating parameters and operating conditions, and correspondingly adjust various engine actuators 152 to control operation of the vehicle. For example, the controller may receive signals from various engine sensors including, but not limited to, engine speed, engine load, boost pressure, exhaust pressure, ambient pressure, exhaust temperature, and the like. Correspondingly, the controller may control aspects and operations of the vehicle system by sending commands to various components such as traction motors, alternator, cylinder valves, throttle, and the like.

As shown in FIG. 1, the engine includes a plurality of cylinders 108. Though FIG. 1 depicts an engine with 8 cylinders, other numbers of cylinders are possible (such as twelve, including six cylinders on each bank of the engine). Each cylinder of the engine includes a knock sensor 110. In this way, the engine includes one knock sensor for each cylinder. As such, each individual cylinder knock sensor may measure data associated with the cylinder it is coupled to. In one example, the knock sensor may be a strain gauge based or accelerometer based knock sensor. The knock sensor may output a voltage which is then received as a voltage signal at the controller. In one embodiment, as described in further detail below with reference to FIGS. 3-4, the controller processes the voltage signal from the knock sensor to determine a corresponding knock level (e.g., knock signal or output) for the individual cylinder which the knock sensor is coupled to. The controller may determine and/or indicate (via setting a diagnostic code or sending a signal to a fueling controller, in one example) that an individual cylinder is knocking in response to the knock level being above a threshold knock level indicative of cylinder knock. In this way, the controller receives data from each knock sensor of each engine cylinder of the engine and processes the received data to indicate engine cylinder knock, subsequently adjust engine operation based on the received data. For example, as described further below with reference to FIGS. 3-7, the controller may adjust the substitution ratio of natural gas torque to total fuel energy/torque of a finite number of groups of the engine cylinders and/or adjust the makeup of the groups based on the received data from the individual cylinder knock sensors.

FIG. 2 depicts an embodiment of a combustion chamber, or cylinder 200, of a multi-cylinder internal combustion engine, such as the engine described above with reference to FIG. 1. For example, the cylinder may be any one of the cylinders 108 shown in FIG. 1. The cylinder may be defined by a cylinder head 201, housing the intake and exhaust valves and liquid fuel injector, described below, and a cylinder block 203.

The engine may be controlled at least partially by a control system including controller 148 which may be in further communication with a vehicle system, such as the locomotive described above with reference to FIG. 1. As described above, the controller may further receive signals from various engine sensors including, but not limited to, engine speed, engine load, boost pressure, exhaust pressure, turbocharger speed, ambient pressure, CO2 levels, exhaust temperature, NOx emission, engine coolant temperature (ECT) from temperature sensor 230 coupled to cooling sleeve 228, knock sensor data, etc. Correspondingly, the controller may control the vehicle system by sending commands to various components such as alternator, cylinder valves, throttle, fuel injectors, etc.

The cylinder (i.e., combustion chamber) may include cylinder liner 204 with a piston 206 positioned therein. The piston may be coupled to a crankshaft 208 so that reciprocating motion of the piston is translated through a connecting rod into rotational motion of the crankshaft. The crankshaft may include a crankshaft speed sensor for outputting a speed (e.g., instantaneous speed) of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger in some embodiments (not shown in FIG. 2) and to atmosphere, via an exhaust manifold. The exhaust passage may further receive exhaust gases from other cylinders of the engine in addition to the cylinder, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head.

The intake valve may be controlled by the controller via an actuator 218. Similarly, the exhaust valve may be controlled by the controller via an actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 232, which may include a fuel tank, fuel pumps, and a fuel rail. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector. As explained further below, fueling to the cylinder may be controlled by the controller actuating the fuel injector based on a commanded substitution ratio.

Further, each cylinder of the engine may be configured to receive gaseous fuel (e.g., natural gas) alternative to or in addition to diesel fuel. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, etc., located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, opening time (in engine crank position or in engine crank degree) and/or duration of opening of the gas admission valve may be adjusted to regulate an amount of gaseous fuel provided to the cylinder. Adjusting the opening timing (e.g., when the gas admission valve is opened and closed) may be referred to herein as adjusting induction timing of gaseous fuel. As one example, the duration of gas admission (or gas valve) opening is defined by the engine crank degrees corresponding to opening and closing of the gas admission valve. Each respective cylinder may be provided with gaseous fuel from an individual gas admission valve, allowing for individual cylinder control in the amount of gaseous fuel provided to the cylinders. In yet another embodiment, gaseous fuel from the gaseous fuel system may be directly injected into the engine cylinders. For example, each cylinder may include a direct fuel injector or gas admission valve (similar to valve 236) coupled directly to an engine cylinder. In this way, both diesel and gaseous fuel may be directly injected into individual engine cylinders (e.g., such as in a high pressure "dual-fuel" direct injection system). Additionally, in one embodiment, each engine cylinder may include a spark plug for igniting fuel, such as natural gas, at the engine cylinder. In another embodiment, each engine cylinder may include an alternate ignition device (other than a spark plug) for igniting fuel at the engine cylinder, such as a laser or an alternate ignition source.

As introduced above, each cylinder of the engine may have a dedicated knock sensor. As such, the engine controller may receive a knock sensor output for each of the engine cylinders. The controller may then determine a knock level for each individual cylinder based on the corresponding knock sensor output and determine whether each individual cylinder is experiencing knock by comparing the knock level (or the raw knock sensor output or signal) to a threshold knock level (or threshold knock sensor output, such as a threshold voltage) that is indicative of cylinder knock. For example, in response to the knock output of an individual cylinder knock sensor being above a set threshold knock output or level (which may be stored in the controller memory), the controller may determine the cylinder to which the knock sensor is coupled is knocking. The controller may also determine a gas torque limit for each cylinder, based on that cylinder's knock sensor output (or based on a knock magnitude for the cylinder). The gas torque limit may be the maximum amount of gas fuel torque (e.g., energy) that may be produced by the cylinder (from combusting fuel at the cylinder) for the current knock level/magnitude (e.g., so that knocking does not get worse). A corresponding substitution ratio of gas torque (to total fuel torque) may then be determined. Fueling (gaseous and diesel) amounts may be commanded according to the set substitution ratio in order to produce the desired levels of gas torque and diesel torque.

The controller may divide all the engine cylinders into two groups (which may also be referred to as "bins"). A first group may be a reduced-knocking group where the cylinders in the first group are either not experiencing knock or experiencing knock at lower (less severe) levels and a second group may be a knocking group where all the cylinders in the second group are or have recently experienced knock at higher (more severe) levels. The cylinders may be divided into the groups based on their determined gas torque limits and corresponding substitution ratios and a set substitution ratio for the first group, as describe further below.

As one embodiment, all the cylinders in the first group may receive natural gas and diesel fuel for combustion in amounts that result in a first substitution ratio of natural gas torque (to total gross indicated torque) (e.g., such as 80% natural gas torque to total torque) and all the cylinders in the second group may receive natural gas and diesel fuel for combustion in amounts that result in a second substitution ratio of natural gas torque (e.g., such as 60% natural gas torque to total torque). Thus, the second substitution ratio is lower than the first substitution ratio. The controller may set and adjust the second substitution ratio to a level corresponding to the gas torque limit (based on the knock level) for the cylinder with the lowest gas torque limit (e.g., the cylinder with the highest knock magnitude and thus is experiencing the most knock). In some examples, the second substitution ratio may reduce knock in all cylinders in the second group. The controller may also set and adjust the first substitution ratio to a level that maximizes the overall (e.g., average) substitution ratio of the engine (e.g., for all cylinders). The controller may then dynamically allocate cylinders into the two groups based on each cylinder's current knock-limited gas torque capability (e.g., the gas torque limit and corresponding substitution ratio). During different periods of engine operation, such as during and/or a period following an engine start, all engine cylinders may be in the first group. As explained further below with reference to FIGS. 3-7, the controller may adjust the makeup of the groups (e.g., by moving one or more cylinders from the first group to the second group or from the second group to the first group) based on individual cylinder knock outputs and corresponding gas torque limits and substitution ratios. In this way, at any one time, fuel may be delivered to each engine cylinder at amounts that correspond to one of two possible substitution ratios. The two substitution ratios and which cylinders receive fuel at which of the two substitution ratios may then be adjusted by the controller based on individual cylinder knock outputs. In this way, fueling to the engine cylinders is controlled in groups, but also based on individual cylinder knock sensor data. Controlling fueling in this way, as compared to completely universal or individual fueling and knock control, may reduce control complexity and engine costs, while at the same time providing increased knock control. Further, by adjusting both the first and second substitution ratios, as described above and further below, the engine may combust a highest possible amount of gaseous fuel, thereby reducing costs.

As another embodiment, all the cylinders in the first group may be operated at a first ignition (e.g., spark ignition or diesel injection) timing (e.g., sparked via a spark plug coupled to the cylinder at the first spark ignition timing relative to a crankshaft angle during a combustion cycle of the cylinder or injected via a diesel fuel injector) and all the cylinders in the second group may be operated at a second ignition timing. The first ignition timing may be a baseline or less retarded ignition timing and the second ignition timing may be a more retarded timing that reduces knock in the cylinders of the second group and is based on the torque limit of the cylinder with the highest knock level. In this embodiment, the engine may be a single fuel engine that uses spark plugs coupled with the cylinder to ignite and combust fuel within the cylinders or that uses diesel injection with compression ignition to combust fuel within the cylinders. Similarly to as described above, the controller may adjust the makeup of the groups (e.g., by moving one or more cylinders from the first group to the second group or moving one or more cylinders from the second group to the first group) based on individual cylinder knock outputs. In this way, the controller may control knock, separately, for two different groups of cylinders, based on individual cylinder knock sensor outputs.

Turning now to FIGS. 3-4, a method 300 is shown for adjusting a substitution ratio to groups of engine cylinders and adjusting a makeup of the groups based on individual cylinder knock sensor outputs. Instructions for carrying out method 300 and the rest of the methods included herein may be executed by a controller (e.g., controller 148 shown in FIGS. 1-2) based on instructions stored on a memory of the controller and in conjunction with signals received from sensors of the engine system, such as the sensors described above with reference to FIG. 1. The controller may employ engine actuators of the engine system to adjust engine operation, according to the methods described below. Method 300 is described below with respect to an engine configured to combust natural gas and diesel fuel. However, it is to be appreciated that method 300 and the rest of the methods described herein likewise apply to engines configured to combust other types of gaseous fuel and non-gaseous fuel, such as hydrogen, syn gas, and propane (as gaseous fuels) and gasoline, ethanol, and kerosene (as non-gaseous fuels). It is to be further appreciated that the term "natural gas torque" includes gaseous fuel torque, e.g., torque generated from the combustion of gaseous fuel, including but not limited to natural gas. Likewise, the term "diesel fuel torque" includes liquid (or non-gaseous) fuel torque, e.g., torque generated from the combustion of liquid fuel, including but not limited to diesel fuel.

The method begins at 302 by estimating and/or measuring engine operating conditions. Engine operating conditions may include engine speed, engine load (e.g., such as notch level), indications of engine knock, cylinder pressures (such as IMEP and/or peak cylinder pressure), MAF (mass air flow), MAP (intake manifold air pressure), MAT (intake manifold air temperature), boost level, and substitution ratio of a first fuel's contribution to gross indicated torque (e.g., gaseous fuel such as natural gas) to a total gross indicated torque (e.g., from two fuels, including the first fuel and a second fuel, such as diesel fuel).

The method proceeds to 304 to deliver gaseous fuel (e.g., natural gas, NG) and liquid fuel (e.g., diesel fuel, DF) to a fixed (e.g., finite) number of groups of cylinders with a different substitution ratio (SR) for each group. In one example, there may be two groups of cylinders. In another example, there may be one group of cylinders or more than two groups of cylinders (up to a number that equals the total number of cylinders of the engine). As explained above, the substitution ratio or the substitution ratio of natural gas torque is defined as the ratio of the gaseous fuel contribution to gross indicated torque (e.g., gas torque) to total gross indicated torque (e.g., gaseous fuel plus diesel fuel contributions to gross indicated torque). Said another way, the substitution ratio may be a ratio of gaseous fuel energy (torque) to total fuel energy (torque) that is produced by combusting corresponding amounts of gaseous and diesel fuel at the engine cylinders. In response to setting or commanding a certain substitution ratio, the controller may command diesel fuel injectors and gas admission valves (or injectors) to inject corresponding amounts of diesel fuel and gaseous fuel which result in the set substitution ratio.

Additionally, as explained above, all cylinders of the engine may be either in the first group of cylinders or the second group of cylinders (or however many groups are being used). For example, all cylinders of the engine may be in the first group and no cylinders may be in the second group (such as during an engine start). In another example, if the engine includes eight total cylinders, six cylinders may be in the first group and the remaining two cylinders may be in the second group. In this way, the two groups (or fixed number of groups) include all the engine cylinders.

While the methods herein are discussed with only two groups of cylinders, in alternate embodiments, there may be more than two groups of cylinders, or only one group of cylinders, which all the cylinders are split up into and which receive fuels corresponding to a different SR for each group.

Returning to 304, the method at 304 may include delivering natural gas and diesel fuel to all cylinders in the first group of cylinders in amounts that result in the first SR via adjusting an injection timing, on timing, and/or duration of opening of a diesel fuel injector (e.g., fuel injector 226 shown in FIG. 2) and gas admission valve (e.g., gas admission valve 236 shown in FIG. 2) coupled to each cylinder of the first group of cylinders to deliver natural gas and diesel to obtain the desired SR and engine output (e.g., torque). In one example, this may include the controller sending actuation signals to the fuel injector and gas admission valve of each cylinder in the first group of cylinders to deliver a quantity of natural gas and diesel fuel for combustion into each cylinder, to produce torque at the first SR. For example, the controller may look up the fueling amounts or pulse width/valve opening signals to send to the fuel injectors and gas admission valves as function of the set SR and driver torque demand and/or in a look-up table where the set SR and driver torque input are inputs and the fueling control signals are the outputs. Likewise, the method at 304 may further include delivering natural gas and diesel fuel to all cylinders in the second group of cylinders in amounts that result in the second SR via adjusting an injection timing, on timing, and/or duration of opening of a diesel fuel injector (e.g., fuel injector 226 shown in FIG. 2) and gas admission valve (e.g., gas admission valve 236 shown in FIG. 2) coupled to each cylinder of the second group of cylinders to deliver natural gas and diesel fuel to obtain the desired SR and engine output (e.g., torque). In this way, each and every cylinder of the engine receives natural gas and diesel fuel to produce either the first SR or the second SR. The first and second SRs may be set according to individual knock sensor outputs of each of the cylinders, as discussed further below. Thus, the method at 304 proceeds according to these set SR values. However, upon start-up of the engine, before any knock sensor output may be obtained, all cylinders may be operated according to a single, baseline SR. Then, as knock outputs are obtained for each individual cylinder, the cylinders may be split up into groups having uniquely set SRs, according to the method described below.

At 306, the method includes obtaining and processing individual cylinder knock sensor outputs (e.g., knock sensor data). As described above, a dedicated knock sensor (e.g., such as one of knock sensors 110 shown in FIG. 1) may be coupled to each engine cylinder. The controller receives the output from each knock sensor and then compares the received output to reference, threshold, or other cylinder knock values. For example, each knock sensor may output a voltage value. The controller may then correlate that voltage value to a knock level and compare the knock level to a threshold knock level or the controller may compare the raw voltage value to a threshold voltage value. The threshold knock level and/or threshold voltage values may be set (e.g., predetermined) values stored in the controller memory which are indicative of cylinder knock (e.g., knock levels or voltages above these thresholds may indicate the corresponding cylinder is experiencing knock or actively knocking).

At 308, the method includes determining whether knock is detected in one or more cylinders based on the individual knock sensor outputs obtained and processed at 306. In one example, the method at 308 may include determining whether the knock level or knock output of each individual cylinder knock sensor is above the threshold level (as discussed above at 306). If the individual cylinder knock sensor output of a cylinder is determined to be above the threshold level, the controller may determine that knock is detected in that cylinder. This method may be performed for each and every cylinder of the engine to determine which cylinder(s) are experiencing knock.

If knock is detected in one or more cylinders, the method continues to 310. At 310, the method includes determining, for each cylinder in which knock was detected, an updated gas torque limit based on prior conditions (e.g., prior knock levels) and the current knock level for the cylinder. As explained above, the gas torque limit may be the maximum amount of gas fuel torque (e.g., energy) that may be produced by the cylinder (from combusting fuel at the cylinder) for the current knock level/magnitude (and also may be based on a prior knock level). The method at 310 may further include determining a corresponding SR of gas torque (to total fuel torque) for the gas torque limit. For example, the SR may vary as a function of how big the knock event was (and thus the gas torque limit) and the current operating point of the engine (e.g., engine speed and/or load and engine toque demand). As one example, the controller may look-up the gas torque limit for each knocking cylinder using a relationship or look-up table stored in memory of the controller, with the current knock level (e.g., output from the individual sensor) and/or prior knock conditions (e.g., levels) as the input(s) and the gas torque limit as the output. The controller may use a similar stored relationship or look-up table to look-up the corresponding SR using the determined gas torque limit and the current engine operating point (e.g., engine speed, power, and manifold temperature) as the inputs and receiving the SR as the output. Additional inputs to these look-up tables for determining the gas torque limit and/or SR may include a value for the capability of the gas admission valves at the current air and gas manifold pressure/temperatures. As explained above, this is performed for each of the knocking cylinders.

Returning to 308, if knock is not detected in one or more of the cylinders, the method continues to 312 to determine whether knock has been detected within a threshold amount of time. For example, if knock was detected previously in the cylinder, within a set threshold of time from the current time, but knock is not currently detected, the method continues to 314. Otherwise, if knock is not currently detected in a cylinder and knock has not been detected for greater than the threshold amount of time, the method continues to 316. As explained above, this decision at 312 is performed for each individual cylinder.

At 314, the method includes, for any cylinder for which no knock is currently detected but has been detected previously within the threshold amount of time, maintaining the gas torque limit for that cylinder (and the corresponding SR) at the previously determined value (e.g., as determined at the time of prior knock detection).

At 316, the method includes, for any cylinder for which no knock is currently detected and has not been detected for greater than the threshold amount of time, increasing the gas torque limit for the cylinder by a determined amount from the previously determined value. The recovery rate, or the rate at which the gas torque limit is increased, may vary as a function of the cylinder's prior SR. For example, for lower SRs, the gas torque limit may be increased at a higher rate (e.g., by 40% of the previous value), but for higher SRs, the gas torque limit may be increased at a lower rate (e.g., by 20% of the previous value).

All of the methods at 310, 314, and 316 continue to 318, as shown in FIG. 4. The method at 318 includes determining whether all cylinder gas torque limits allow operation at or above the set, first SR. For example, the method at 318 may include, for each cylinder, comparing the determined SR corresponding to the gas torque limit for that cylinder to the set, first SR. If the SR for each and every cylinder is at or greater than the set, first SR for the first group, the method continues to 320 to maintain or move all cylinders of the engine into the first group and fuel each and every cylinder in the single, first group according to the first SR. The method then continues to 322 to command gaseous fueling and diesel fueling to levels (e.g., amounts and/or timings) that produce the first SR for each cylinder. Commanding these fueling levels may proceed similarly to as explained above at 304.

Alternatively, if at least one cylinder has a gas torque limit that does not allow operation at or above the first SR (e.g., its determined SR is less than the first SR), the method continues to 324. At 324, the method includes updating the makeup of the groups based on the updated, individual cylinder gas torque limits and corresponding individual SRs to maximize the overall gas consumption of the engine. This may include, at 326, setting the SR of the lowest group (e.g., the second SR of the second SR for two total groups) to the SR for the lowest individual cylinder gas torque limit. For example, the SR for the group with the lowest set SR, or the most heavily knocking group, may be set at the SR of the cylinder with the lowest gas torque limit (and thus lowest SR). The method further includes, at 328, setting the first SR (of the first, highest group) to the SR corresponding to the gas torque limit of the individual cylinder that results in the highest weighted average SR for the engine. Examples for setting the group SRs and adjusting the makeup of the groups are shown in FIGS. 5-7, as described further below. For example, as explained further below with reference to FIGS. 5-7, the individual cylinder SR that results in the highest possible gas consumption at the engine (for all cylinders) is selected as the first SR.

The method further includes, at 330, moving each individual cylinder into the group that results in the individual cylinder not being commanded to generate more gas torque than its individual limit or the first SR, whichever is more restrictive. For example, for two total groups, all cylinders with a SR corresponding to its individual gas torque limit that is greater or equal than the first SR may be moved into (or maintained in if already assigned to that group) the first group. All other cylinders are then placed into the second group. In this way, no cylinder is operated at a SR that generates more gas torque than its individual gas torque limit.

The method then continues to 333 to fuel each group of cylinders according to the set SR of natural gas torque. The method at 333 may proceed similarly to the fueling method described with reference to the methods at 322 and 304. The method then ends.

While method 300 of FIGS. 3-4 shows a method for adjusting fueling according to set SRs to groups of engine cylinders and adjusting a makeup of the groups based on individual cylinder knock sensor outputs, in alternate embodiments, a similar method may be applied to a single fuel engine utilizing a different type of knock mitigating action, such as ignition timing adjustments. For example, in a single fuel engine that combusts one type of fuel at the cylinders and ignites the fuel via spark plugs coupled to the cylinders, retarding a set spark ignition timing may reduce knock. Thus, following a method similar to that of method 300, the cylinders may be broken up into two different groups, where each group of cylinders receives spark at a different spark ignition timing. Specifically, all the cylinders in the first group may be operated at a first spark ignition timing and all the cylinders in the second group may be operated at a second spark ignition timing. The second ignition timing may be a more retarded timing than the first ignition timing. Similarly to as described above, the controller may adjust the makeup of the groups (e.g., by moving one or more cylinders from the first group to the second group or moving one or more cylinders from the second group to the first group) based on individual cylinder knock outputs, as described above with reference to method 300.

FIGS. 5-7 show tables illustrating different examples of cylinder gas torque limits during engine operation, different set group SRs, and adjusted makeup of the groups. For example, FIG. 5 shows a first table 500 illustrating gas torque limits calculated for each cylinder of the engine (12 cylinders shown in the example of FIGS. 5-7, though engines having a different number cylinders than 12 is also possible) based on individual knock sensor outputs of each cylinder obtained at a first time point during engine operation. FIG. 6 shows a second table 600 illustrating gas torque limits calculated for each cylinder of the engine based on individual knock sensor outputs of each cylinder obtained at a second time point during engine operation, the second time point occurring after the first time point and within a threshold amount of time of the first time point (e.g., the threshold amount of time discussed above with reference to the method at 312 in FIG. 3). Finally, FIG. 7 shows a third table 700 illustrating gas torque limits calculated for each cylinder of the engine based on individual knock sensor outputs of each cylinder obtained at a third time point during engine operation, the third time point occurring after the second time point and within a threshold amount of time of the second time point. Each of the first table 500, second table 600, and third table 700 includes a first column 502 displaying the cylinder number (1-12 for a 12 cylinder engine) and a second column 504 displaying the calculated gas torque limit for each cylinder, which is calculated based on the knock sensor output (e.g., knock level) for that cylinder according the method 300 of FIGS. 3-4. Each of the first table 500, second table 600, and third table 700 further includes a third column 506 displaying the number of cylinders in a first set (e.g., group) of cylinders, referred to as set 1, if the SR for that cylinder were selected as the set 1 SR (as listed in the fifth column 510), a fourth column 508 displaying the number of cylinders in a second set (e.g., group) of cylinders, referred to as set 2, if the SR for that cylinder were selected as the set 1 SR, and a fifth column 510 displaying the SR that corresponds to the gas torque limit for that cylinder, and would be the set 1 SR if that cylinder were selected for the set 1 SR. Each of the first table 500, second table 600, and third table 700 further includes a sixth column 512 displaying the set 2 SR, which is selected to be the SR of the cylinder with the lowest gas torque limit, and a seventh column displaying the average SR for the engine if the SR for that cylinder were selected as the set 1 SR. The example shown in FIGS. 5-7 are for two total groups (e.g., sets) of cylinders (which include all cylinders of the engine). However, in alternate embodiments, the number of groups which the cylinders are divided into may be more or less than two (e.g., one, three, four, or the like).

As explained above with reference to 310 of FIG. 3, the gas torque limit for each cylinder is determined based on the individual knock sensor output for that cylinder and the corresponding SR for that cylinder is determined based on the gas torque limit and engine operating conditions (e.g., torque output demand). The SR corresponding to the individual gas torque limit for each cylinder is shown in column 510. Thus, as gas torque limit increases, the SR displayed in column 510, which would produce gas torque at the gas torque limit, increases. Likewise, as the gas torque limit for a cylinder decreases, the SR displayed in column 510 for that cylinder also decreases. The average SR shown in column 514 is a weighted average for the total engine SR and is calculated according to the following formula:

$$SR_{avg} = \frac{(\text{\#Set 1 } cyls * \text{Set 1 } SR) + (\text{\#Set 2 } cyls * \text{Set 2 } SR)}{\text{Total \# } Cyls}, \quad \text{(Equation 1)}$$

Where the # of set 1 cylinders is taken from column 506, the set 1 SR is taken from column 510, the # of set 2 cylinders is taken from column 508, the set 2 SR is taken from column 512, and the total number of cylinders for this example is 12. As explained above, the set 2 SR is selected as the SR (from column 510) of the cylinder having the lowest gas torque limit. It should be noted that the numbers shown in tables 500, 600, and 700 (e.g., gas torque limit values and SR values) are exemplary in nature and are not meant to be limiting. For example, the numbers shown in these tables are meant to illustrate the method of selecting the SRs for the groups and adjusting a makeup of the groups, as described above with reference to FIGS. 3-4. In alternate embodiments, different values for the gas torque limit and SRs may be possible for varying levels of knock.

Turning first to table 500 of FIG. 5, cylinders 1-4 are experiencing no knock (knock levels may be above a threshold) and their gas torque limits are set at a relatively high value (1,000 Newton-meters). As such, their corresponding SRs are set in column 510 to 80% (this may be a highest allowed SR for the engine, in one example). The remaining cylinders are experiencing varying levels of knock ranging from more lightly knocking (e.g., cylinders 5-8) to more severely knocking (e.g., cylinders 9-12). Cylinder 12 has the lowest gas torque limit and corresponding SR. As such, the SR for set 2 is set at 40% (and this populates the entirety of column 512). The average SRs in column 514 are calculated and then evaluated to find the highest average SR for the engine, which would result in maximizing gas consumption of the engine (relative to liquid fuel consumption). In this example, the SR of cylinder 8 (65%), if selected for the set 1 SR, produces the highest average SR for the engine (57%). Thus, the SR for set 1 is set at 65%. All cylinders having SRs (from column 510) at or above this selected set 1 SR are placed into set 1 while all cylinders having SRs below this selected set 1 SR are placed into set 2. As shown in table 500, 8 cylinders (cylinders 1-8) are in set 1 and receive gaseous and diesel fuel at levels (e.g., amounts) that produce the set 1 SR and 4 cylinders (cylinders 9-12) are in set 2 and receive gaseous and diesel fuel at levels that produces the set 2 SR. The cylinders of set 1 may be non-knocking or more lightly knocking cylinders while the cylinders in set 2 may be more heavily knocking cylinders. Separating the cylinders into groups in this way results in a maximum amount of gaseous fuel to be consumed at the engine, without exceeding the gas torque limits of any cylinder. In this way, engine efficiency is increased while decreasing fueling costs.

Looking now at table 600 of FIG. 6, new individual cylinder knock outputs are obtained. No knock is detected in cylinders 1-3, and thus, the gas torque limits remain at their previous, maximal levels. Knock is detected in cylinder 4 for the first time, and as a result, the gas torque limit is calculated based on the knock level (as output from the knock sensor for cylinder 4) and a corresponding SR is determined (stays at 80%). These values are then updated in table 600 (from the previous levels in table 500). As seen in table 600, the gas torque limit for cylinder 4 (columns 504 and 510, respectively) decreases from its previous values. No knock is detected in cylinders 5-7. However, because knock was previously detected (within the threshold amount of time, as shown in table 500), the gas torque limits (and corresponding SRs) for these cylinders are maintained at their prior values (from table 500). As one example, the threshold amount of time may be since the previous knock determination. As yet another example, the threshold amount a time may be in a range of 5-30 seconds. The threshold amount of time may be adjusted based on engine speed/load conditions and/or a magnitude of the knock level. For example, for a more severe knock event at full speed/load, the threshold amount of time may be 30 seconds whereas at more minor knock levels and lower speeds, the threshold amount of time may be closer to 5 seconds. For cylinders 8-12, knock is detected again, but at lower levels than previously detected levels (e.g., as compared to levels detected at the time of table 500). In response to detecting knock in these cylinders, the controller determines updated gas torque limits for each cylinder, based on the individual cylinder knock sensor outputs, and corresponding updated SRs. As shown in columns 504 and 510 of table 600, these values increase from the values shown in table 500, for each of cylinders 8-12. Since the gas torque limit and corresponding SR for cylinder 12 increases from the previous values, but cylinder 12 is still the cylinder with the lowest gas torque limit and SR, the set 2 SR (column 512) is updated to be the newly updated SR of cylinder 12 (41%). After updating the gas torque limits and SRs, as necessary, for each cylinder, the rank of each cylinder (e.g., gas torque limit value compared to values of other cylinders) is used to updated the # of cylinders in set 1 and set 2 if the SR of that cylinder were selected as the set 1 SR (as shown in columns 506 and 508). The average SRs for the engine in column 514 are then recalculated according to the updated values of table 600. As seen in column 514, the highest average SR for the engine increases to 61.0% and now corresponds to the SR of cylinder 10 (instead of cylinder 8, as in table 500). Thus, the SR for set 1 is set to the SR of cylinder 10 (65%). Though the SR of set 1 remains the same and SR of set 2 is adjusted from the levels determined from table 500, the makeup of both groups changes (e.g., cylinders 1-10 are now in set 1 while cylinders 11-12 are now in set 2).

In table 700 of FIG. 7, new individual cylinder knock outputs are obtained for the current time point. No knock is detected and knock has not been detected within the threshold amount of time for cylinders 1-3, 5, and 7. Thus, in response to no knock being detected in these cylinders for more than the threshold amount of time, the gas torque limits for each of cylinder 5 and 7 (since these were not at the maximum level) are increased from their previous levels (previous levels of table 600). No knock is detected at the current time point in cylinders 4, 8-10, and 12, but knock was previously detected within the threshold amount of time. As a result, the previous gas torque limit and corresponding SRs are maintained for these cylinders. Knock is detected in both cylinders 11 and 6, and thus the gas torque limits and corresponding SRs are recalculated and updated within table 700. Cylinders 12 and 6 share the same, lowest gas torque limit and SR, and thus this SR (41%) is maintained as the set 2 SR. The average SRs for the engine are recalculated at each cylinder. As shown in table 700, the highest average SR for the engine in column 514 is for cylinder 7 at 62.8%. Thus, the SR of cylinder 7 (70%) is selected and set as the set 1 SR. The makeup of cylinders within the two sets of cylinders is also adjusted since 7 cylinders (cylinders 1-5, 7, and 9) have SRs at or above the set 1 SR and 5 cylinders (cylinders 6, 8, and 10-12) have SRs below the set 1 SR. Thus, cylinders 6, 8, and 10 are moved from set 1 to set 2 while all other cylinders remain in their previously assigned sets.

In this way, natural gas and diesel fuel may be delivered to a finite number of groups of cylinders (e.g., two) at amounts that produce a finite number of substitution ratios of natural gas torque. In one example, each cylinder of a first group of cylinders receives fuel (natural gas and diesel fuel) at amounts that produce a common, first substitution ratio of natural gas torque and each cylinder of a second group of cylinders receives fuel (natural gas and diesel fuel) at amounts that produce a common, second substitution ratio, where all cylinders of the engine are in either the first group of the second group. The first substitution ratio may be a higher substitution ratio and the second substitution ratio is a lower substitution ratio. Both the first substitution ratio and the second substitution ratio may be individually adjustable. As discussed above, the first and second substitution ratios may be adjusted based on individual knock sensor outputs of the cylinders and the makeup of the groups (e.g., which cylinders are in which groups) may be adjusted (e.g., changed) based on individual knock sensor outputs of each cylinder of the first group and second group of cylinders. The technical effect of delivering natural gas and diesel fuel at a common, first substitution ratio of natural gas (torque) to each cylinder of a first group of cylinders; delivering natural gas and diesel fuel at a common, second substitution ratio of natural gas (torque) to each cylinder of a second group of cylinders; and adjusting a makeup of the first group of cylinders and the second group of cylinders based on individual cylinder knock sensor outputs is to reduce the occurrence of engine knock while simplifying engine control, thereby reducing engine costs and increasing engine efficiency. For example, by providing fuels at levels that produce only two different substitution ratios, at any one time, the substitution ratios are not constantly being changed across all cylinders, thereby reducing control complexity and engine costs. At the same time, adjusting which cylinders receive which of the two different substitution ratios based on individual cylinder knock sensor outputs may allow efficient knock control to be provided to a smaller subset of cylinders that need it while maintaining a higher substitution ratio in other cylinders, thereby reducing fueling costs. Further, by adjusting the substitution ratios of each group based on individual cylinder knock sensor outputs, the gaseous fuel consumption for the engine may be maximized while staying within gas torque limits of all cylinders, thereby reducing fueling costs and increasing engine efficiency.

In one embodiment, a system for an engine is provided. The system includes a controller that can cause the engine deliver a gaseous fuel and a non-gaseous fuel to a first group of cylinders at a common, first substitution ratio of gas to liquid; to deliver gaseous and non-gaseous fuel to a second group of cylinders at a common, second substitution ratio of gas to liquid, the second substitution ratio lower than the first substitution ratio; and to change a makeup of each of the first group of cylinders and the second group of cylinders based on individual knock sensor outputs of each cylinder of the first group of cylinders and the second group of cylinders. Suitable gaseous fuels may include hydrogen, syn gas, propane, and natural gas. Suitable non-gaseous fuels may include, for example, diesel, gasoline, kerosene/JP1, and ethanol. In one embodiment, the gaseous fuel may be a mix of gasses, and may further comprise, for example, water vapor, supplemental air/oxygen, hydrogen, or recirculated exhaust gas. For gaseous mixtures, these gas constituents may be pre-mixed prior to entering the cylinder or may be admitted then mixed, or may be mixed while being injected into the cylinder.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for an engine, comprising:
a controller with computer readable instructions stored on non-transitory memory that when executed during operation of the engine cause the controller to:
deliver gaseous fuel and liquid fuel to a first group of cylinders at amounts that produce a common, first substitution ratio of gaseous fuel torque to total fuel torque;
deliver gaseous fuel and liquid fuel to a second group of cylinders at amounts that produce a common, second substitution ratio of gaseous fuel torque to total fuel torque, the second substitution ratio lower than the first substitution ratio; and
change a makeup of each of the first group of cylinders and the second group of cylinders based on individual knock sensor outputs of each cylinder of the first group of cylinders and the second group of cylinders,
wherein the controller commands a plurality of fuel injectors and gas admission valves to deliver the gaseous fuel and the liquid fuel to the first group of cylinders and the second group of cylinders.

2. The system of claim 1, wherein the first group of cylinders and the second group of cylinders include all cylinders of the engine.

3. The system of claim 1, wherein each of the first substitution ratio and the second substitution ratio are adjustable based on the individual cylinder knock sensor outputs, wherein the first substitution ratio is a largest substitution ratio that maximizes gaseous fuel consumption at the engine, and wherein the second substitution ratio is a substitution ratio corresponding to a gas torque limit of a first cylinder that is experiencing a highest level of knock out of all cylinders of the engine.

4. The system of claim 3, wherein changing the makeup of each of the first group of cylinders and the second group of cylinders includes moving a second cylinder from the first group of cylinders to the second group of cylinders in response to an individual knock sensor output of the second cylinder indicating the second cylinder has a greater gas torque limit than allowed by the first substitution ratio and switching to delivering gaseous fuel and liquid fuel to the second cylinder at amounts that produce the second substitution ratio.

5. The system of claim 4, wherein the computer readable instructions further cause the controller to reduce the second substitution ratio in response to the individual knock sensor output of the second cylinder being higher than the individual knock sensor output of the first cylinder.

6. The system of claim 1, wherein the computer readable instructions further cause the controller to:
for each cylinder, determine a gas torque limit based on the individual cylinder knock sensor output and determine a corresponding substitution ratio for the determined gas torque limit, thereby generating a determined substitution ratio for each cylinder;
set the second substitution ratio to a lowest substitution ratio of each determined substitution ratio for all cylinders of the engine and set the first substitution ratio to the determined substitution ratio that results in a highest average substitution ratio for all cylinders of the engine; and
change the makeup of each of the first group of cylinders and the second group of cylinders based on the determined substitution ratio for each cylinder and the set first substitution ratio.

7. The system of claim 6, wherein changing the makeup of each of the first group of cylinders and the second group of cylinders based on the determined substitution ratio for each cylinder and the set first substitution ratio includes moving each cylinder with a determined substitution ratio at or greater than the first substitution ratio into the first group of cylinders and moving each cylinder with a determined substitution ratio less than the first substitution ratio into the second group.

8. The system of claim 6, wherein the computer readable instructions further cause the controller to move all cylinders into the first group of cylinders and fuel all cylinders as a single group according to the first substitution ratio in response to the gas torque limit for each and every cylinder allowing operation at or above the set first substitution ratio.

9. The system of claim 1, wherein the computer readable instructions further cause the controller to, upon engine-startup of the engine, move all cylinders of the engine into the first group of cylinders and set the first substitution ratio at a baseline substitution ratio.

10. The system of claim 1, wherein the gaseous fuel is natural gas and the liquid fuel is diesel fuel, wherein the engine is a dual fuel engine including a plurality of cylinders combusting the natural gas and the diesel fuel, and wherein the total fuel torque includes a sum of natural gas fuel torque and diesel fuel torque produced by the cylinder.

11. A method for an engine, comprising:
delivering natural gas and diesel fuel at amounts that produce a common, first substitution ratio of natural gas torque to total fuel torque for each cylinder of a first group of cylinders;
delivering natural gas and diesel fuel at amounts that produce a common, second substitution ratio of natural gas torque to total fuel torque for each cylinder of a second group of cylinders, the second substitution ratio lower than the first substitution ratio; and
adjusting a makeup of the first group of cylinders and the second group of cylinders based on individual cylinder knock sensor outputs.

12. The method of claim 11, wherein a number of cylinders in the first group of cylinders and the second group of cylinders make up a total number of cylinders of the engine.

13. The method of claim 11, wherein adjusting the makeup of the first group of cylinders and the second group of cylinders based on individual cylinder knock sensor outputs includes adjusting the makeup of the first group of cylinders and the second group of cylinders based on individual cylinder gas torque limits, the individual cylinder gas torque limits determined for each cylinder based on the corresponding individual cylinder knock sensor outputs.

14. The method of claim 13, further comprising setting the second substitution ratio to a level that corresponds to a lowest individual cylinder gas torque limit out of all the determined individual cylinder gas torque limits, the lowest individual cylinder gas torque limit being the individual cylinder gas torque limit for the cylinder experiencing a highest level of knock out of all cylinder of the engine.

15. The method of claim 13, further comprising, for each cylinder, determining a weighted average substitution ratio for the first group of cylinders and the second group of cylinders, assuming a substitution ratio corresponding to the individual cylinder gas torque limit of the cylinder is selected as the first substitution ratio and further comprising setting the first substitution ratio to the substitution ratio of the cylinder with the highest determined weighted average substitution ratio.

16. The method of claim 15, wherein adjusting the makeup of the first group of cylinders and the second group of cylinders includes moving all cylinders with a substitution ratio corresponding to the individual cylinder gas torque limit of the cylinder that is at or above the set first substitution ratio into the first group of cylinders and moving all remaining cylinders into the second group of cylinders.

17. The method of claim 15, wherein adjusting the makeup of the first group of cylinders and the second group of cylinders includes moving a cylinder from the first group of cylinders to the second group of cylinders in response to a substitution ratio corresponding to the individual cylinder gas torque limit of the cylinder being below the set first substitution ratio.

18. The method of claim 11, further comprising individually adjusting each of the first substitution ratio and the second substation ratio based on individual cylinder knock sensor outputs and then adjusting the makeup of the first group of cylinders and the second group of cylinders based on the individually adjusted first substitution ratio and second substitution ratio and the individual knock sensor outputs.

19. A method for an engine, comprising:
at engine start-up, delivering natural gas and diesel fuel at amounts that produce a first substitution ratio of natural gas torque to total fuel torque for each cylinder of a first group of cylinders, where the first substitution ratio is a baseline substitution ratio, and where the first group of cylinders includes all cylinders of the engine; and
in response to detecting knock in one or more cylinders of the first group of cylinders, adjusting the first substitution ratio and setting a second substitution ratio of natural gas torque to total fuel torque for a second group of cylinders based on individual cylinder gas torque limits and corresponding, individual cylinder substitution ratios for maintaining cylinder operation at or above the individual cylinder gas torque limits and adjusting a makeup of the first group of cylinders and the second group of cylinders based on the adjusted first substitution ratio, the adjusted first substitution ratio set to a level that results in a highest average substitution ratio for all cylinders of the engine.

20. The method of claim 19, wherein the individual cylinder gas torque limits are based on individual cylinder knock levels determined from individual cylinder knock sensors and further comprising continuing to adjust the first substitution ratio, the second substitution ratio, and the makeup of the first group of cylinders and the second group of cylinders as the individual cylinder gas torque limits change.

* * * * *